United States Patent [19]

Chang

[11] Patent Number: 5,680,547
[45] Date of Patent: Oct. 21, 1997

[54] METHOD AND APPARATUS FOR CONTROLLING NETWORK AND WORKSTATION ACCESS PRIOR TO WORKSTATION BOOT

[75] Inventor: Steve Ming-Jang Chang, Tokyo, Japan

[73] Assignee: Trend Micro Devices Incorporated, Taipei, Taiwan

[21] Appl. No.: 512,572

[22] Filed: Aug. 8, 1995

Related U.S. Application Data

[63] Continuation of Ser. No. 101,837, Aug. 4, 1993, Pat. No. 5,444,850.
[51] Int. Cl.$^6$ .................................................. G06F 15/177
[52] U.S. Cl. ............................ 395/200.01; 395/200.11; 380/3; 380/23
[58] Field of Search ..................... 395/200.01, 200.11; 380/3, 23

[56] References Cited

U.S. PATENT DOCUMENTS

| | | | |
|---|---|---|---|
| 4,590,557 | 5/1986 | Lillie | 395/651 |
| 4,982,430 | 1/1991 | Frezza et al. | 380/50 |
| 5,073,933 | 12/1991 | Rosenthal | 380/25 |
| 5,121,345 | 6/1992 | Lentz . | |
| 5,138,712 | 8/1992 | Corbin . | |
| 5,146,568 | 9/1992 | Flaherty et al. . | |
| 5,204,897 | 4/1993 | Wyman | 380/4 |
| 5,237,690 | 8/1993 | Bealkowski et al. | 395/653 |
| 5,247,659 | 9/1993 | Curran et al. | 395/651 |
| 5,261,104 | 11/1993 | Bertram et al. | 395/651 |
| 5,276,863 | 1/1994 | Heider | 395/200.12 |
| 5,280,627 | 1/1994 | Flaherty et al. | 395/652 |
| 5,325,529 | 6/1994 | Brown et al. | 380/50 |
| 5,325,532 | 6/1994 | Crosswy et al. | 380/25 |

*Primary Examiner*—Krisna Lim
*Attorney, Agent, or Firm*—Fenwick & West LLP

[57] ABSTRACT

A method and apparatus for preboot file and information transfer between workstations ad other workstations or workstations and servers on local area networks. During a workstation boot sequence, the various components of the workstation and network operating system are loaded and executed. Since all control of the workstation after the boot sequence is passed to the workstation operating system, any management tasks performed after boot must be performed by application programs running on the workstation. The present invention overcomes problems created by using such application programs to perform management tasks by providing a hardware component, for example a ROM or PROM containing appropriate programming placed in the usually unused boot ROM socket of a LAN card installed in the individual workstations, or a chip including a PROM or ROM built onto the motherboard or system board of the individual workstations. The program in the PROM is set up so that, at system startup, prior to loading of the workstation operating system software during the boot sequence, it performs certain operating system functions by using the basic input/output system (BIOS) of the workstation to enable the workstation to communicate with a server on the network and make the necessary resources of the workstation available to a server management application running on the server via the network. This process, controlled by a system administrator, allows a variety of preboot functions to take place in the workstation.

45 Claims, 5 Drawing Sheets

METHOD AND APPARATUS FOR CONTROLLING NETWORK AND WORKSTATION ACCESS PRIOR TO WORKSTATION BOOT

This application is a continuation of application Ser. No: 08/101,837 filed on 4 Aug. 1993, now U.S. Pat. No. 5,444,850 issued on Aug. 22, 1995.

BACKGROUND OF THE INVENTION

1. Field of the Invention

The invention is directed to personal computers used as workstations in local area networks (LANs).

2. Background of the Invention

It is common to connect individual personal computers as workstations using what is often referred to as a local area network or LAN. A LAN is usually defined as a network of computers, usually connected by a cable or wire at a single geographical location such as one or more floors of an office building, so that various resources can be shared among the workstations and/or allow the individual workstations to send and receive electronic mail or E-Mail.

Typically, local area networks enable individual users to access databases or files physically associated with another computer, called a server, or with other workstations on the LAN. In this manner, data and programs which are needed by more than one user can be maintained on a single computer on the network and still be available to other workstations on the network. In this instance the computer with the common data is referred to as the server and the workstations of the individual users are called clients. In other situations, a database or files may set up on various workstations such that each can function as a server and each can function as a client. This is frequently referred to a peer-to-peer structure.

In large networks, with hundreds or, even thousands of workstations and dozens of servers, administration or management of the individual workstations can be a cumbersome task. This administration consists of, but is not limited to, the following tasks:

Workstation configuration control

System security

Workstation fault correction

Application monitoring for software license compliance

Software application distribution

Software version control

Customization of user environment (i.e. menus, boot files, etc.)

User training

In such larger networks, this administration can be very time-consuming and tedious because the system administrator must be in the same physical location as the workstation. Since these workstations can be spread over a large area such as a large multi-story building, a significant amount of time and effort is spent in traveling between workstations to perform management tasks.

Also, these management tasks are often associated with computer functions that take place during the workstation's boot (startup), cycle. They often require repeat reboots of the workstation to test changes in configuration. From a security standpoint, much of the ability to control access to both workstations and servers is vastly improved by being able to control functions that occur before, during and after the boot process. Current methods depend upon control of functions occurring during or after the boot process. Since control of many functions prior to workstation boot allows the network administrator to impose significantly more control over the workstation some method of pre-boot control is very desirable.

BRIEF SUMMARY OF THE INVENTION

The present invention is directed to a method and apparatus for preboot file and information transfer between workstations and other workstations or workstations and servers on local area networks. For convenience, this description will be with reference to DOS-based systems. However, persons skilled in the art will recognize that the inventive concepts have application in UNIX based systems and other network environments. Specifically, it is necessary to provide a mechanism by which a network administrator can carry out the functions, as well as other network management tasks. That mechanism should be imposed prior to workstation boot. Workstations using MS-DOS, PC-DOS or other operating system variations such as UNIX execute a startup process called a boot sequence. During the boot sequence the various components of the workstation and network operating system are loaded and executed. Since all control of the workstation after the boot sequence is passed to the operating system, any management tasks performed after boot must be performed by application programs running on the workstation. These application programs are often called utilities. In order for utilities to run at the same time as other applications (such as word processing, database management or E-Mail) the utilities must be loaded resident in the workstation memory. That causes a reduction in available application memory and, often, cause conflicts which can cause the workstation to "lock-up" or "hang". In that case, the workstation must be rebooted and all programs reloaded. There is, likewise, a strong probability of damage or loss of data which was in use during the failure.

The present invention overcomes these problems by providing a hardware component, for example a ROM or PROM containing appropriate programming placed in the usually unused boot ROM socket of a LAN card installed in the individual workstations, or a chip including a PROM or ROM built onto the motherboard or system board of the individual workstations. The program in the PROM can be set up so that, at system startup, prior to loading of the workstation operating system software during the boot sequence, it performs certain operating system functions by using the basic input/output system (BIOS) of the workstation to enable the workstation to communicate with a server on the network and make the necessary resources of the workstation available to a server management application running on the server via the network. This process, controlled by a system administrator, allows a variety of preboot functions to take place in the workstation.

For example, by exchanging IDs encoded within workstation and server hardware the workstation can be validated for connection to the network. This adds a greatly improved dimension of security to the network. Or, as another example, a workstation which has experienced a conflict resulting in a failure could be rebooted remotely and, during the reboot cycle, boot files changed to clear possible conflicts. While this process is common, it is always performed by an operator entering commands while sitting at the workstation. The invention enables this functionality to be carried out remotely. The invention could also provide preboot updates to critical boot files prior to workstation boot by transferring those files from the server in advance of their use. Workstations that had experienced a virus attack on the boot sectors of their hard drives could have that damage detected and repaired prior to executing the boot sequence providing an increased measure of anti-virus protection. It is to be noted that the applications, utilities or malicious programs such as viruses that may be present on the workstation hard disk will be under the control of the invention since all preboot operations take place prior to loading and running the workstation's operating system.

The invention enables a rich assortment of high-value technologies because it is:

Protocol and operating system independent

Only activated on request

Not a TSR—it occupies no memory

A tool that allows the system administrator to force a server connection

Able to create a network connection for the workstation at boot time even if the local drive is damaged or the user does not log in A remote access to the workstation hard drive without user intervention Some examples of possible server management applications enabled by the present invention are:

Configuration management (remote edit and installation of workstation system files)

Identification and authentication services

Smart hub management

Critical node monitoring

Workstation crash recovery

Remote software installation, distribution, metering and diagnostics

Single sign-on synchronized passwords

Finally, the invention provides a rich variety of network administrator benefits because:

Thousands of hours per year can be saved because no "office hiking" is required to gain access to user workstations that have hung or crashed User workstations can be configured centrally The invention allows appropriate workstation configuration regardless of the environment. Users who cannot tolerate TSRs due to ill-behaved applications still benefit since the invention requires no TSRs Security can be improved materially by adding pre-boot authentication for both user and workstation Software installation, updating, version control and metering can be greatly simplified and centralized The administrator's overall view of the network is materially improved.

DETAILED DESCRIPTION OF THE INVENTION

Figure 1:
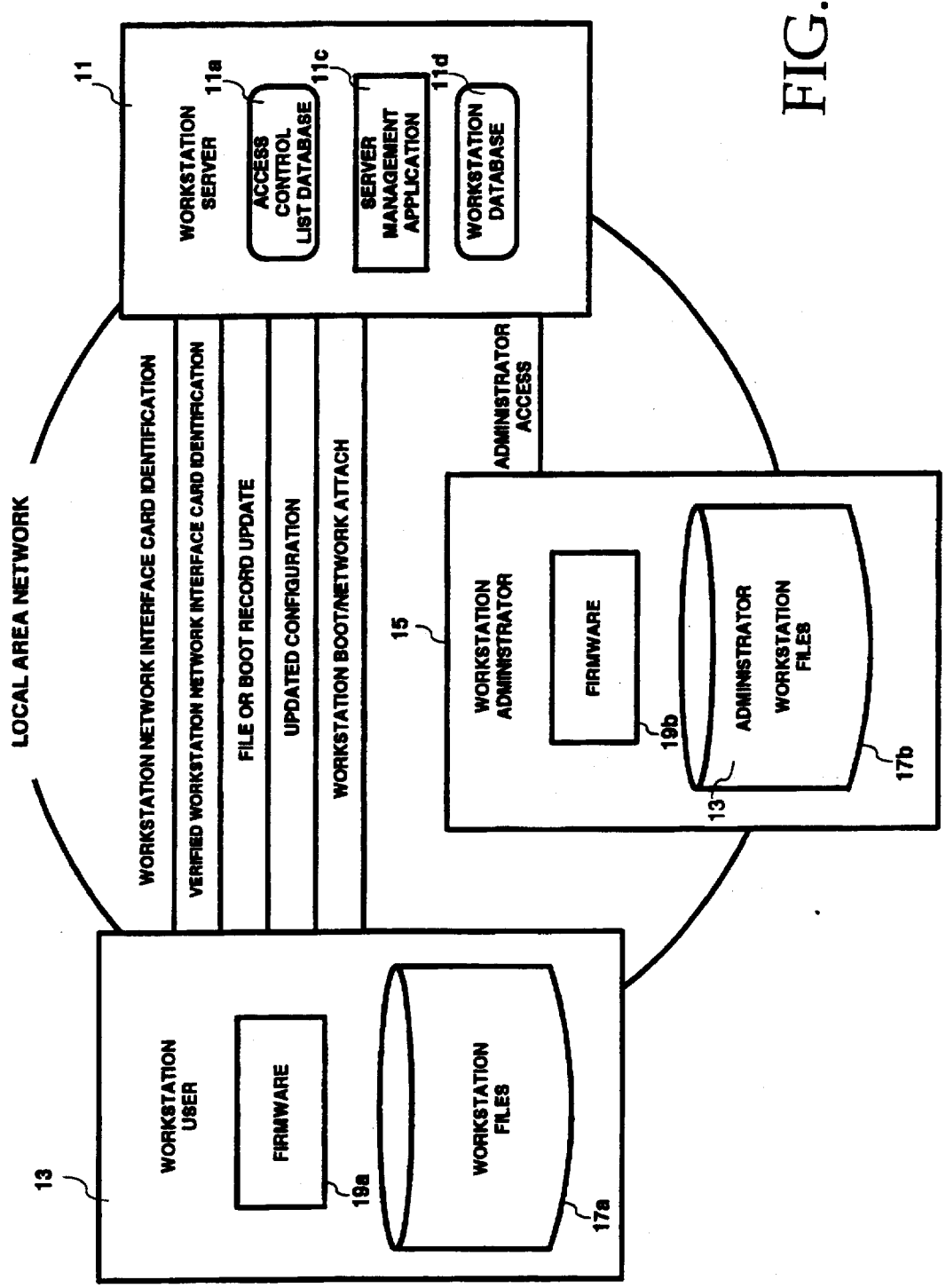
FIG. 1 is a block overview diagram showing a local area network with a pair of client workstations and a single server.

FIG. 1 is a block overview diagram showing a local area network with a single server workstation 11, a client workstation designated User 13 and a client workstation designated Administrator 15. The server workstation 11 includes server files (not shown), an access control list database (ACL-DB) 11a, and a server management application (SMA) such as a NetWare Loadable Module (NLM) in a Novell NetWare environment, which functions in conjunction with the invention, and a workstation database (DB) 11d which contains information used by the invention to modify information in the workstation during the preboot process. Both client workstations 13 and 15 are configured the same, each containing a hardware component (typically a programmable read only memory (PROM) and application specific integrated circuit (ASIC) combination, referred to herein as firmware, installed on the workstation network interface card (NIC) or motherboard) 19a and 19b respectively, but the administrator client also includes an administrator program 13. The firmware manages workstation functions and communicates with the server prior to loading of the complete workstation operating system.

The client workstation firmware (19a or 19b) also provides preboot access to the client operating system's file services and contains a functional subset of the client workstation operating system and the client workstation component of the network operating system. Its purpose is to communicate with the server. The server hardware component takes instructions from the server SMA. The server SMA contains control routines to manage operation of the invention. The specifics for incorporating suitable programming in the SMA depend upon the functionality desired to be performed. However, such specifics are well within the skills of persons having ordinary ability in the field of the invention based upon the descriptions provided herein. Administrative utilities are executed in the designated workstation. One of those utilities could be a scripting language which allows the administrator to program a series of client-server operations.

FIG. 1 shows the basic communications between the client workstation 13 and the server workstation 11 and the client workstation 15 and the server workstation 11. The basic communications (which actually take place over the network) provide the mechanism for making a connection between client and server. Once that connection has been made, the client 13 is authenticated as a legitimate client to the server 11. Once the client is identified to the server, any preboot activity such as file transfers, file updates or operating system rescue (due to malicious or accidental damage) can take place automatically under control of the SMA.

In particular, each time a client workstation attempts to connect to the network, firmware 19a or 19b executes a program which seeks a server on the network with which to communicate. The appropriate server, e.g. the one with the SMA (the NLM in a Novell NetWare environment), responds to the client workstation. The client workstation then sends, using the invented subsystem, its network interface card (NIC) address to the server. The server SMA verifies the address in the access control list 11a which resides in the server. The server SMA then performs whatever tasks it is preprogrammed to perform. The invention, being an enabling technology, insofar as it resides in the SMA, can be customized to provide a wide variety of preboot services. For example, it could be customized to update files by transferring new files to the client prior to boot since the file management system is operating on the client. It could be customized to verify that the boot sector of the client is free of virus infection and that the boot sector is intact. If not, it could remove the virus and restore the boot sector from the workstation database 11d residing safely on the server.

Once all client-server preboot functions are complete and acknowledged by the client, the firmware 19a or 19b on the client returns boot control to the client's basic input/output system (BIOS). The client then boots in the normal manner, loading the complete workstation operating system and attaches to the network as it normally would. The advantages of the preboot sequence of the invention is that any damage to the client workstation's boot or operating system that would prevent normal boot or cause further damage can be managed and recovered during the preboot process. The invention contains a functional subset of the complete operating system installed in the client workstation which allows the client to partially boot from a sterile environment without using any of the operating system elements installed in the client workstation which could become damaged. This sterile environment is maintained within the firmware of the invention. A second advantage is that any updates or repairs to critical software systems can be managed centrally using a sterile operating environment without interfering with the user of the client in any way.

The invented technique for initiating a network connection with a server sends a registered unique identification to the server, such as the workstation network interface card (NIC) ID (for example, in an Ethernet environment the Ethernet hardware address), through the standard or de-facto network protocol. The network protocol could be varied depending on the networking environment, such as TCP/IP of Internet, SPX/IPX of Novell's NetWare, or any standard LAN protocols defined by Institute of Electrical and Electronic Engineers (IEEE). The server application checks for a pre-configured database to determine whether the connection should be accepted. After connection is established, the server SMA sends managing requests to instruct the program in the workstation firmware to perform appropriate management tasks. The firmware sends back the result of its executed operation to the SMA and goes back to the normal booting process when approved by the server.

The invention utilizes a client server technology, implemented as firmware (i.e., programming in a PROM or ROM), which allows full, remote pre-boot control of any network workstation, regardless of operating environment, without the use of terminate and stay resident (TSR) programs at the workstation. The invention provides an open architecture upon which developers and OEMs can build custom server-based client management applications.

One example of an implementation of the invention utilizes a single PROM containing the necessary programming (i.e., firmware) which is plugged in an ASIC, which provides address decoding, which ASIC plugs into the normally unused boot ROM socket on most network interface cards. The necessary programming provides file handler, component control, network services, server management command interface, and executable services engine functions. In an alternate embodiment, the programming could be contained in a flash erasable programmable read only memory (EEPROM) which would avoid the need for the address decoding ASIC for reasons which should be apparent to persons skilled in the art.

The firmware on the client communicates with server SMA via a customer application programming interface (API) or industry standard protocol such as SNMP. Virtually any server management application can be written in a variety of programming languages, or existing SNMP management applications can be accessed directly.

Figure 2:
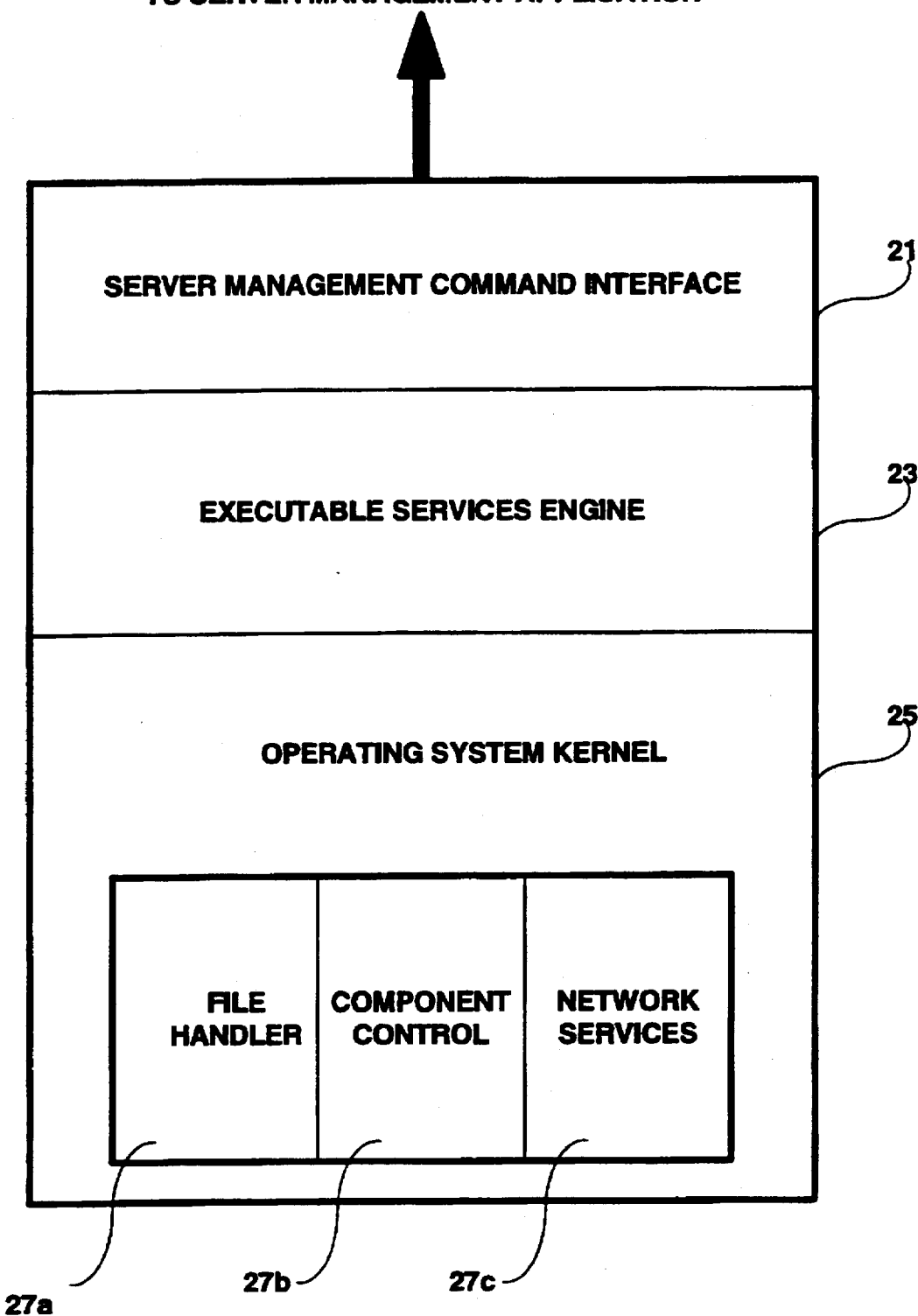
FIG. 2 is a block diagram showing the functional components of the programming contained in a PROM or ROM forming part of the invention.

A simplified block diagram for the programming in the PROM or ROM of the invention is shown in FIG. 2.

Excluding housekeeping services and functions not germane to this description, the system includes:

A Server Management Command Interface 21: This is the basic interface between the firmware on the client and the Server Management Application (SMA) on the server. Its main task is to interpret the commands sent in packets from the server SMA and to construct a response packet containing the result of performed operations in a form which can be understood by the SMA. It serves the same function as an SNMP, an industry defined management protocol.

Executable Services Engine 23: The executable services engine provides the proprietary pre-boot functions that allow control of the workstation pre-boot processes. The executable services engine receives its instructions based upon the requirements of the SMA. In other words, the executable services engine and the SMA together control the actions of the workstation prior to the commencement of the workstation boot process.

Operating System Kernel 25: The operating system kernel is, in effect, a "mini operating system." The operating system kernel utilizes file handler 27a, component control 27b and network services 27c and communications appropriate to the installed operating environment. This environment includes both the workstation environment (DOS, O/S2, UNIX etc.) and the network operating system (NetWare, LAN Manager, Vines, etc.).

The programming necessary to provide the functionality of server management command interface 21 and executable services engine 23 is well within the skills of a person having ordinary skills in the field of the invention. A suitable operating system kernel 25 is available from Hitech Business Software, Inc. of Wilmington Delaware.

Figure 3A:
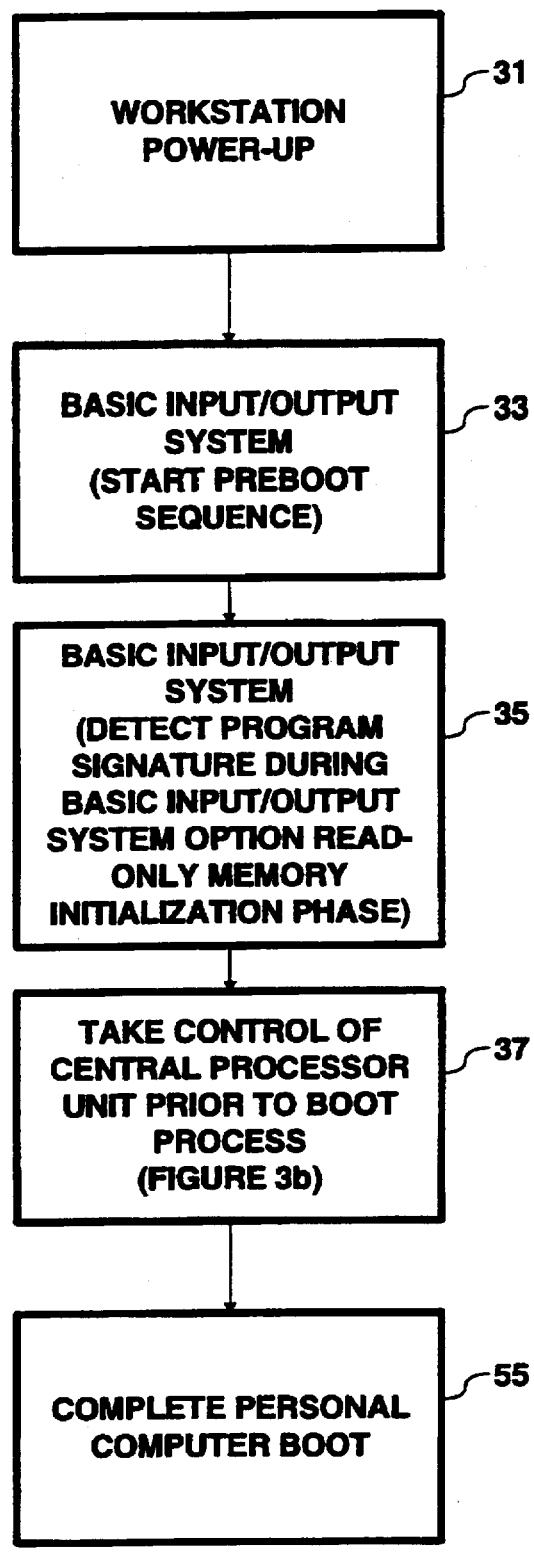
FIGS. 3a and 3b are flow charts of the preboot sequence controlled by the invention.
Figure 3B:
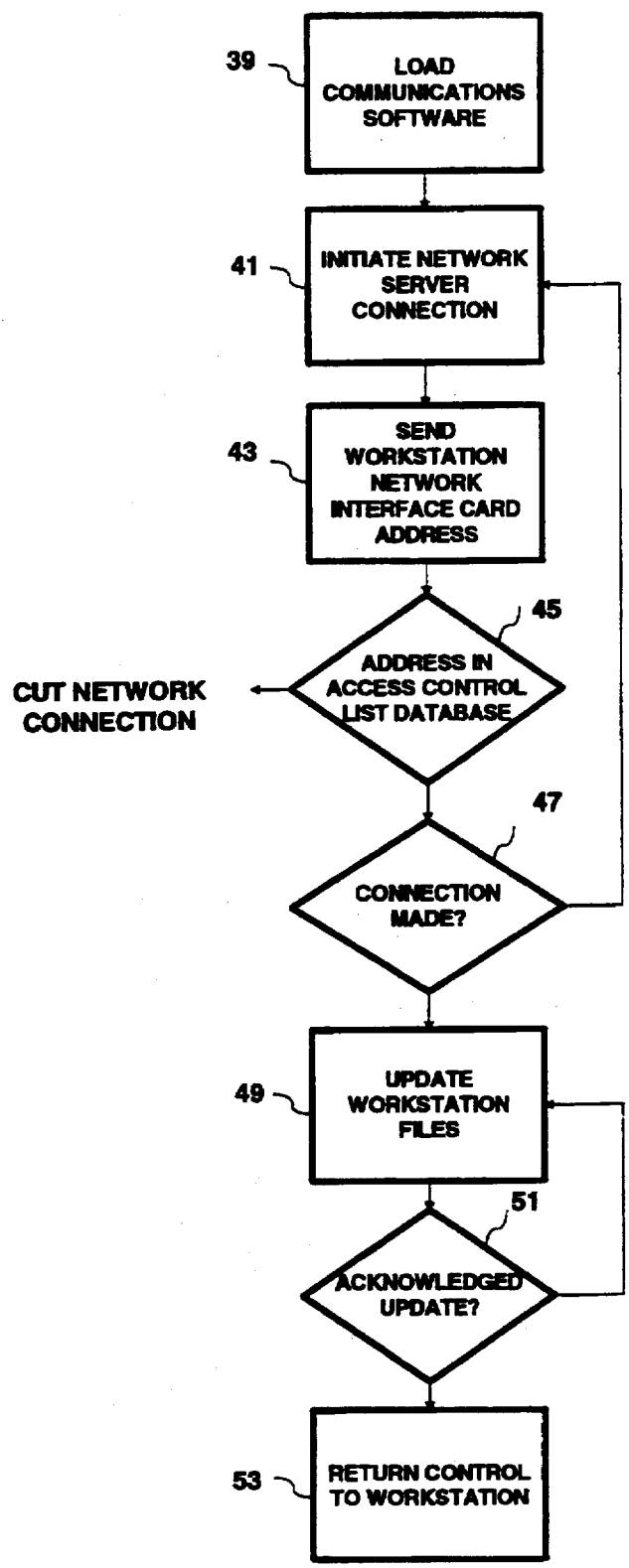

FIGS. 3a and 3b are flow charts showing the processing performed by programming in the PROM or ROM at system startup.

In normal operation, as shown in the flowcharts of FIGS. 3a and 3b, the invention interrupts the boot process after the BIOS (in an MS-DOS environment, for example) is executed but before DOS executes. Specifically, upon workstation power-up (step) 31, the system BIOS is executed (step 33) in a manner well known in the art. The system BIOS detects the existence of a program in a ROM socket on a network interface card (step 35) and passes control to this program (step 37). Referring now to FIG. 3b, upon control being passed to the program in the PROM, network communications software is loaded from the workstation storage medium (step 39) using its internal mini-operating system and the appropriate network communications protocols. In this manner, communication with the server SMA is initiated (step 41). Under instructions from the SMA, the invention executes the appropriate functions contained in the executive services engine of the program in the PROM. The executive services engine uses low level control functions, such as the BIOS under DOS, to perform the instructions sent by the server SMA to the workstation. After initiation of the server connection in step 41, the workstation NIC address is sent to the server for verification (step 43). If the NIC address is not in the ACL-DB (step 45), the connection to the network is cut, otherwise an attempt is made to connect the workstation to the network (step 47) and, if successful, workstation files are updated (step 49). Otherwise, the attempt to initiate the network connection is repeated (step 41). In step 49, the server sends any required workstation updates to the client and performs any assigned tasks under control from the SMA. During update workstation files step 49, any processes programmed in the PROM are executed and acknowledged. This process execution and acknowledgment is accomplished by the firmware under instruction from the server SMA. The server and client communicate directly with workstation hardware and firmware at a level below the normal operating system, thus providing a sterile, controlled operating environment. After the update is successfully performed and acknowledged (ACK) by the client (step 51), control is returned to the workstation boot process (step 53) and the normal boot process is completed (step 55 of FIG. 3a). The foregoing functionality set forth in steps 39 and 41 is performed by file handler 27a and 27b, while the functionality set forth in steps 43, 45, 47, 49, 51 and 53 is performed by network services 27c and executable services engine 23.

Since the operating system kernel in the firmware is controlling the workstation, a pristine operating environment exists. The workstation can execute any instructions sent by the SMA, exit from control of the firmware and commence normal boot. Any changes made during the pre-boot process by the SMA are reflected immediately at the workstation.

Figure 4:
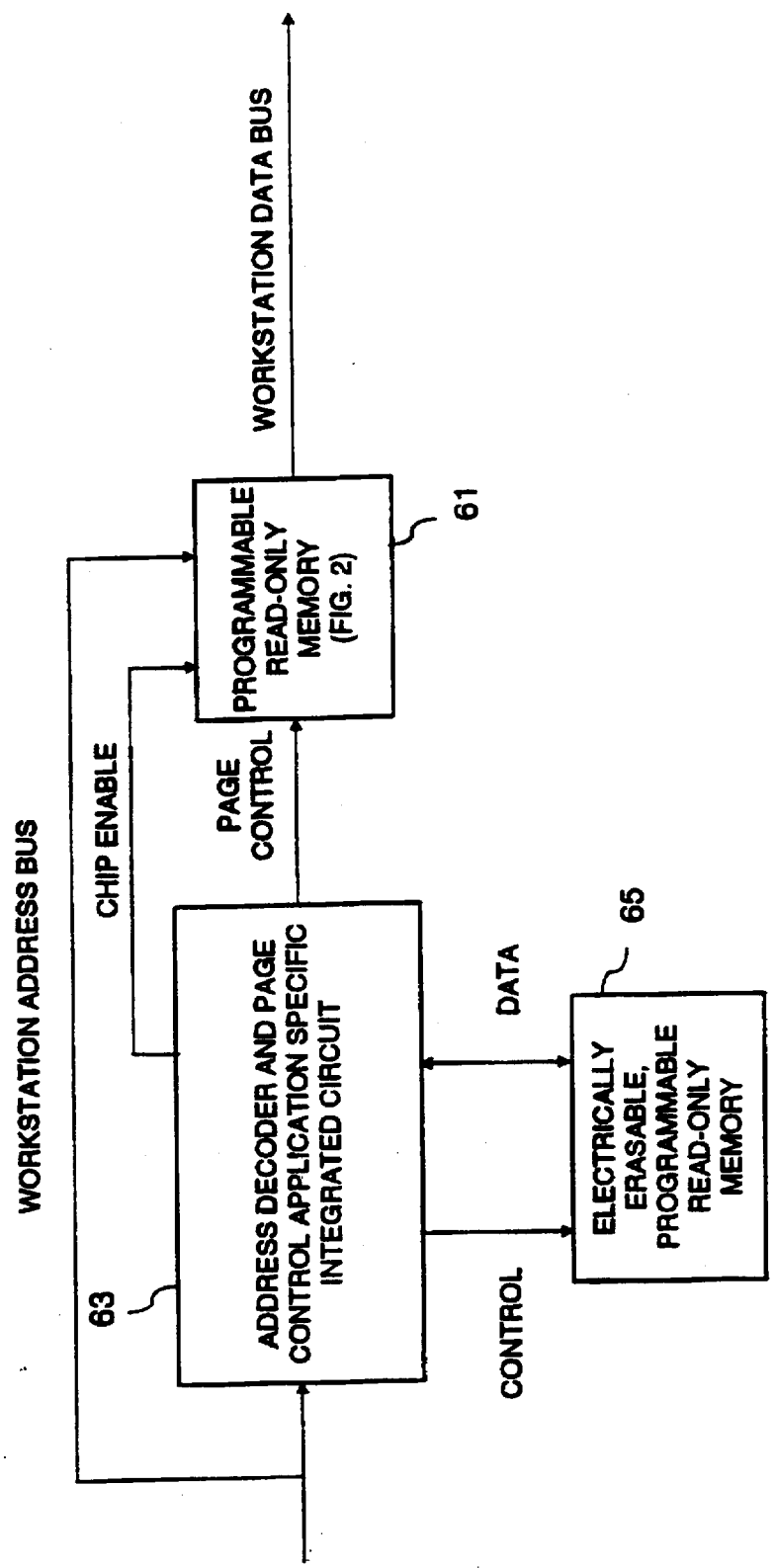
FIG. 4 is a block diagram showing of EE-PROM/ASIC implementation of the invention.

Referring to FIG. 4, the firmware 19a and 19b is implemented on a read only memory (ROM) such as a 256 K PROM 61. As shown in FIG. 4, also necessary is a 2 K (or larger) electrically erasable programmable read only memory (EE-PROM), or random access memory (RAM) 63 which functions as a workstation configuration memory which is set up by the user when the workstation is first set or when additional hardware is added. For purposes of this invention, the only information which needs to be stored in this memory is the address of the network driver program on the workstation disk drive or other storage medium which is needed to communicate with other devices on the network. As previously noted, when implemented in this manner, an address decoder with page control 63 is also necessary. The address decoder logic provides a shared memory paging mechanism. It is needed in a typical DOS system since the boot PROM can only provide 8 K bytes of addressable memory space. In order to access the 256 K memory space needed by the invention, the address decoder logic is needed to page the ROM address space into the 8 K page accessible to the workstation CPU. Preferably, the address decoder functionality is provided using an ASIC. The details for producing a suitable ASIC which can be plugged into a network interface card and into which a PROM containing the programming used by the invention can be plugged should be readily apparent to persons skilled in relevant art.

Some additional examples of the preboot functionality which could be programmed into the firmware are checking to insure that the client is running only the most current versions of application software, the most current databases for virus scanners are available to the client and that the correct boot files are in place on the client. If errors are found during the preboot process, the PROM programming could provide the appropriate updates from the server files.

For the purposes of this invention, however, potential customized functions are not considered. Only the basic, enabling technology present in the client used in the preboot process form the present invention as defined in the following claims.

We claim:

1. An apparatus for enabling predetermined computer resources to be controlled via a network connection prior to loading of a complete computer operating system onto a storage medium accessible to a processor of the computer, comprising:

first control transfer means, operable upon computer startup, for transferring control from a computer pre-boot process to an external process prior to loading the complete computer operating system onto a storage medium accessible to the processor of the computer;

network connection means, responsive to said external process, for initiating a network connection of the computer to a server on the network;

identification means responsive to said network connection means, for authenticating the identification of the computer through said server after initiating said network connection, to ensure that the computer is authorized to be connected to the network; and second control transfer means, responsive to said identification means for returning control to the computer boot process to load the complete computer operating system, after authenticating the computer identification.

2. The apparatus of claim 1, wherein said first control means includes means for detecting existence of a program module in a BIOS extension of said computer to which control is passed upon the detection of said BIOS extension.

3. The apparatus of claim 1, wherein said first control means includes means for detecting existence of a program module in a storage device accessible by the processor of said computer to which control is passed upon the detection of said program module.

4. The apparatus of claim 3, wherein said storage device is a hard disk drive.

5. The apparatus of claim 1, wherein the network connection initiation means comprises:

means for loading a network communication program onto a storage device accessible to the processor of said computer;

means for executing said loaded network communications program to establish connection with a server management application that is executing in said server.

6. The apparatus of claim 5, wherein the authentication means comprises:

means for receiving instructions from said server management application instructing the computer to send a unique identifier to the server over the network;

means for receiving from said server one of an authorization and a denial of authorization.

7. The apparatus of claim 1, wherein the return control means comprises means for exiting the program module and returning execution control to said computer boot process.

8. An apparatus for enabling predetermined computer resources to be controlled via a network connection prior to loading of a complete computer operating system onto a storage medium accessible to a processor of the computer, comprising:

first control transfer means, operable upon computer startup, for transferring control from a computer pre-boot process to an external process prior to loading the complete computer operating system onto a storage medium accessible to a processor of the computer;

network connection means, responsive to said external process, for initiating a network connection of the computer to a server on the network;

updating means, responsive to said network connection means, for updating selected files in the computer based upon data located within files in the server; and second control transfer means, responsive to said updating means for returning control to the computer boot process to load the complete computer operating system, after updating said selected files.

9. The apparatus of claim 8, wherein said first control means includes means for detecting existence of a program module in a BIOS extension of said computer to which control is passed upon the detection of said BIOS extension.

10. The apparatus of claim 8, wherein said first control means includes means for detecting existence of a program module in a storage device accessible by the processor of said computer to which control is passed upon the detection of said program module.

11. The apparatus of claim 10, wherein said storage device is a hard disk drive.

12. The apparatus of claim 8, wherein the network connection initiation means comprises:
  means for loading a network communication program onto a storage device accessible to the processor of said computer;
  means for executing said loaded network communications program to establish connection with a server management application that is executing in said server.

13. The apparatus of claim 8, wherein the return control means comprises means for exiting the program module and returning execution control to said computer boot process.

14. An apparatus for enabling predetermined computer resources to be controlled via a network connection prior to loading of a complete computer operating system onto a storage medium accessible to a processor of the computer, comprising;
  first control transfer means, operable upon computer startup, for transferring control from a computer preboot process to an external process prior to loading the complete computer operating system onto a storage medium accessible to a processor of the computer;
  network connection means, responsive to said external process, for initiating a network connection of the computer to a server on the network;
  receiving means, responsive to said network connection means, for receiving instructions from said server;
  execution means, responsive to said receiving means, for causing said processor to execute said received instructions; and
  second control transfer means, responsive to said execution means for returning control to the computer boot process to load the complete computer operating system, after executing said received instructions.

15. The apparatus of claim 14, wherein said first control means includes means for detecting existence of a program module in a BIOS extension of said computer to which control is passed upon the detection of said BIOS extension.

16. The apparatus of claim 14, wherein said first control means includes means for detecting existence of a program module in a storage device accessible by the processor of said computer to which control is passed upon the detection of said program module.

17. The apparatus of claim 16, wherein said storage device is a hard disk drive.

18. The apparatus of claim 14, wherein the network connection initiation means comprises:
  means for loading a network communication program onto a storage device accessible to the processor of said computer;
  means for executing said loaded network communications program to establish connection with a server management application that is executing in said server.

19. The apparatus of claim 14, wherein the return control means comprises means for exiting the program module and returning execution control to said computer boot process.

20. A method for enabling predetermined computer resources, including predetermined files, to be controlled by a server coupled to the computer by a network connection prior to loading of a complete computer operating system onto a first storage device accessible to a processor of the computer, comprising the steps of:
  connecting the server to the computer using the network connection to enable the server to communicate with the computer; and
  transferring control from a computer preboot process to an external process prior to loading the complete computer operating system onto the first storage device.

21. The method of claim 20, further comprising the step of:
  authenticating the identification of the computer to ensure that the computer is authorized to be connected to the network.

22. The method of claim 21, wherein said step of transferring control includes:
  detecting the existence of a program module in a ROM socket of a network interface card; and
  transferring control to said program module if said program module is detected.

23. The method of claim 21, wherein said step of transferring control includes:
  detecting the existence of a program module in a BIOS extension of the computer; and
  transferring control to said program module if said program module is detected.

24. The method of claim 21, wherein said step of transferring control includes:
  detecting the existence of a program module in a second storage device accessible by the computer; and
  transferring control to said program module if said program module is detected.

25. The method of claim 24, wherein said second storage device is a hard disk drive.

26. The method of claim 21, wherein said step of connecting the server includes:
  loading a network communications program onto a second storage device accessible to the processor of the computer; and
  executing said loaded network communications program to establish a connection with a server management application that is executing in a server coupled to said network.

27. The method of claim 26, wherein said step of authenticating the identification of the computer includes:
  receiving instructions from said server management application instructing the workstation to send a unique identifier to the server over the network; and
  receiving one of an authorization signal and a denial of authorization signal from said server.

28. The method of claim 21, further comprising the step of:
  returning control to the computer boot process to load the complete computer operating system.

29. The method of claim 21, further comprising the step of:
  updating predetermined files located within a memory device in the computer using files located in the server.

30. The method of claim 29, further comprising the step of:
  executing instructions located in said server.

31. The method of claim 20, further comprising the step of:

updating predetermined files located within a memory device in the computer using files located in the server.

32. The method of claim 31, wherein said step of transferring control includes:

detecting the existence of a program module in a ROM socket of a network interface card; and transferring control to said program module if said program module is detected.

33. The method of claim 31, wherein said step of transferring control includes:

detecting the existence of a program module in a BIOS extension of the computer; and transferring control to said program module if said program module is detected.

34. The method of claim 31, wherein said step of transferring control includes:

detecting the existence of a program module in a second storage device accessible by the computer; and transferring control to said program module if said program module is detected.

35. The method of claim 34, wherein said second storage device is a hard disk drive.

36. The method of claim 31, wherein said step of connecting the server includes:

loading a network communications program onto a second storage device accessible to the processor of the computer; and executing said loaded network communications program to establish a connection with a server management application that is executing in a server coupled to said network.

37. The method of claim 31, further comprising the step of:

returning control to the computer boot process to load the complete computer operating system.

38. The method of claim 20, further comprising the step of:

executing instructions located in said server.

39. The method of claim 38, wherein said step of transferring control includes:

detecting the existence of a program module in a ROM socket of a network interface card; and transferring control to said program module if said program module is detected.

40. The method of claim 38, wherein said step of transferring control includes:

detecting the existence of a program module in a BIOS extension of the computer; and transferring control to said program module if said program module is detected.

41. The method of claim 38, wherein said step of transferring control includes:

detecting the existence of a program module in a second storage device accessible by the computer; and transferring control to said program module if said program module is detected.

42. The method of claim 41, wherein said second storage device is a hard disk drive.

43. The method of claim 38, wherein said step of connecting the server includes:

loading a network communications program onto a second storage device accessible to the processor of the computer; and executing said loaded network communications program to establish a connection with a server management application that is executing in a server coupled to said network.

44. The method of claim 38, further comprising the step of:

authenticating the identification of the computer to ensure that the computer is authorized to be connected to the network.

45. The method of claim 38, further comprising the step of:

returning control to the computer boot process to load the complete computer operating system.

* * * * *